United States Patent
Couch

(10) Patent No.: US 8,347,548 B1
(45) Date of Patent: Jan. 8, 2013

(54) COUNTERBALANCED FISHING HOOK

(75) Inventor: Andrew W. Couch, Garner, NC (US)

(73) Assignee: Betts Tackle, Ltd., Fuquay Varina, NC (US)

( * ) Notice: Subject to any disclaimer, the term of this patent is extended or adjusted under 35 U.S.C. 154(b) by 143 days.

(21) Appl. No.: 12/927,190

(22) Filed: Nov. 9, 2010

(51) Int. Cl.
*A01K 83/00* (2006.01)

(52) U.S. Cl. ...................................... 43/44.81; 43/42.39

(58) Field of Classification Search ............... 43/44.81, 43/42.39, 44.83
See application file for complete search history.

(56) References Cited

U.S. PATENT DOCUMENTS

| | | | | |
|---|---|---|---|---|
| 1,357,678 | A * | 11/1920 | Bain | 43/44.81 |
| 3,248,820 | A * | 5/1966 | Lamar | 43/42.29 |
| 4,214,398 | A * | 7/1980 | Campbell et al. | 43/43.16 |
| 4,713,907 | A * | 12/1987 | Dudeck | 43/42.39 |
| 4,819,366 | A * | 4/1989 | Manno | 43/44.81 |
| 5,216,830 | A * | 6/1993 | Brott, II | 43/42.39 |
| 5,231,786 | A * | 8/1993 | Hughes | 43/42.39 |
| 5,664,364 | A * | 9/1997 | Clark | 43/43.16 |
| 5,901,494 | A * | 5/1999 | Reed | 43/44.81 |
| 7,415,793 | B1 * | 8/2008 | Borchardt | 43/42.36 |
| 7,877,923 | B2 * | 2/2011 | Dudley | 43/42.39 |
| 2001/0045048 | A1 * | 11/2001 | Johnson | 43/42.39 |
| 2005/0132634 | A1 * | 6/2005 | Reed | 43/44.81 |
| 2006/0156614 | A1 * | 7/2006 | Brzozowski | 43/44.82 |
| 2006/0191187 | A1 * | 8/2006 | Falcon | 43/44.81 |
| 2006/0213111 | A1 * | 9/2006 | Mitchell | 43/42.39 |
| 2009/0119972 | A1 * | 5/2009 | Reilly | 43/44.81 |
| 2010/0005703 | A1 * | 1/2010 | Williams, Jr. | 43/43.16 |
| 2010/0223833 | A1 * | 9/2010 | Rigney | 43/42.22 |

OTHER PUBLICATIONS

Fish Hook, A hook is a hook right? Not So!, May 4, 2009, www.bassfishingandcatching.com, pp. 3-4 of PDF file.*

* cited by examiner

*Primary Examiner* — Darren W Ark
*Assistant Examiner* — Timothy Schwarz
(74) *Attorney, Agent, or Firm* — Michael R. Philips

(57) ABSTRACT

A counterbalanced fishing hook having an eye oriented at an angle to the shank. A weight is mounted to the eye and shank in a position to counterbalance the weight of the hook when a line is connected to the eye and the hook is suspended underwater. In a second embodiment, the shank has a horizontal straight portion and a portion that is bent at an angle with the curved portion and the barb oriented in a plane parallel to and displaced from the plane of a straight shank portion. The second embodiment employs a flat weight that is oriented parallel to the plane of the curved portion and the barb for holding the barb above the bottom of a body of water.

9 Claims, 2 Drawing Sheets

COUNTERBALANCED FISHING HOOK

FIELD OF THE INVENTION

The present invention relates to the field of fishing equipment, and more particularly to a fishing hook that is adapted for operating in a non-vertical or horizontal plane.

BACKGROUND OF THE INVENTION

Most fishing hooks are formed with an eye at a first end for attachment to a fishing line and a curved portion with a sharp barb at a second end. In use, the conventional fishing hook hangs vertically down from the end of the line. A live or artificial lure is mounted on the hook to attract a fish. When a fish takes the hook, the line is pulled up to set the hook and then the fish can be reeled in.

There is a class of fish for which the conventional hooks are not generally effective. Fish such as flounder open their mouths horizontally rather than vertically. For this reason, a flounder can take a vertically suspended lure into its mouth, but not be caught.

SUMMARY OF THE INVENTION

The present invention provides a counterbalanced fishing hook that effectively overcomes the drawbacks of the known prior art with respect to flounder. The counterbalanced fishing hook is formed with the eye thereof positioned in a plane perpendicular to the barb and curved end portion. A weight is mounted to the shank of the fishing hook, leaving a part of the eye exposed for being attached to a line. The weight is selected to have a specific mass and is mounted with the center of gravity at a sufficient distance from the distal end of the hook to effectively counterbalance and hold the hook in a non-vertical plane. A float may optionally be tied to the line to hold the counterbalanced fishing hook at a selected depth in a body of water. In a second embodiment of the invention, the shank of the counterbalanced fishing hook is bent to orient a portion of the fishing hook at an angle to horizontal. The curved portion and barb remain parallel, but offset from a horizontal portion of the shank. A substantially flat weight is mounted to the horizontal portion of the shank. In use, the line is let out sufficiently to permit the flat weight to ride along the bottom of a body of water as the curved portion and barb are held in a plane above the bottom, enabling a flounder to be caught.

BRIEF DESCRIPTION OF THE DRAWINGS

The present invention is best understood in conjunction with the accompanying drawing figures in which like elements are identified by similar reference numerals and wherein.

DETAILED DESCRIPTION OF THE PREFERRED EMBODIMENTS

Figure 1:
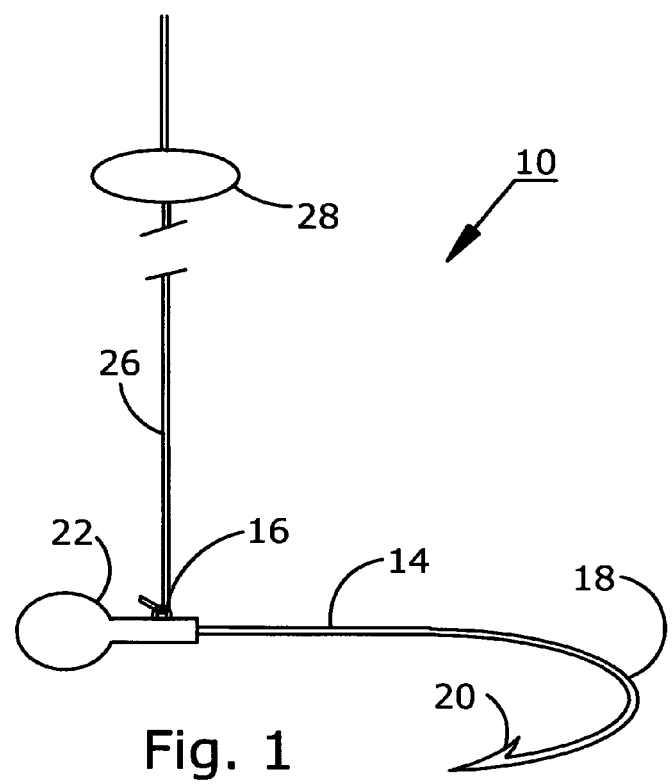
FIG. 1 is a front perspective view of the counterbalanced fishing hook of the invention according to a first embodiment.
Figure 2:
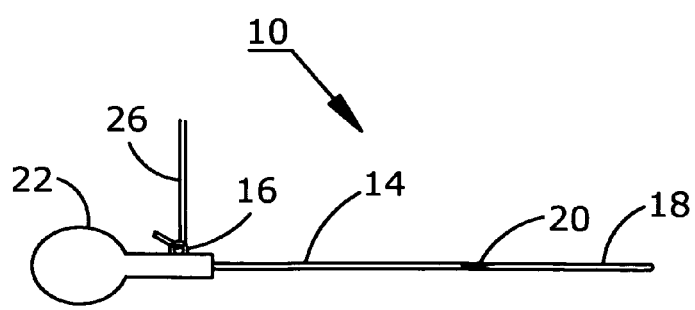
FIG. 2 is a side elevation view of the counterbalanced fishing hook of FIG. 1.
Figure 2A:
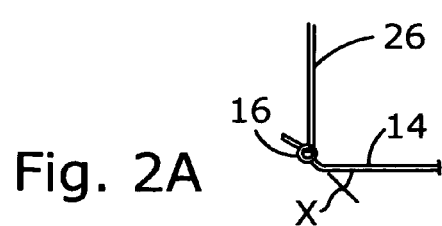
FIG. 2A is a partial side elevation view of the shank and eye of the fishing hook without the counterbalancing weight to show the orientation of the eye relative to the shank.

Referring to FIG. 1 and FIGS. 2 and 2A, counterbalanced fishing hook 10 is illustrated in perspective view and in side elevation view as it is suspended in water by a line 26. Hook 10 includes an eye 16, a shank 14, a curved portion 18 and a barb 20. A weight 22 is affixed to hook 10 at eye 16, and optionally with a float 28 attached at a higher level along line 26. Weight 22 may be mounted in various positions relative to eye 16. The mass of weight 22 is positioned with the center of gravity at a selected distance to one side of eye 16 sufficient to counterbalance the mass of hook 10, causing hook 10 to reside in a non-vertical plane. As illustrated, hook 10 is in a state of equilibrium with weight 22 to remain in a horizontal plane. As illustrated best in FIG. 2A, eye 16 is formed in a plane that is substantially perpendicular to the plane of curved portion 18 (see FIG. 1) and oriented at an angle X relative to shank 14. In the preferred embodiment of the invention, angle X is between approximately 30° and 90°, and most preferably approximately 45°. The angular relation between eye 16 and shank 14 has been determined to allow weight 22 to be secured to shank 14 and maintain the horizontal orientation of hook curved portion 18 while leaving a portion of eye 16 exposed for the attachment of line 26.

The first embodiment described above in relation to FIGS. 1, 2 and 2A provides a counterbalanced fishing hook wherein curved portion 18 and barb 20 are held horizontal underwater to increase the chance of catching a flounder. A live or artificial lure is to be placed onto barb 20 and curved portion 18 in the usual manner. As will be understood, the mass and position of the lure will affect the angle of hook 10 from fully horizontal to hanging at a somewhat downward angle. While weight 22 is illustrated as elliptical in shape, this is an example only and is not to be considered a limitation of the invention. Float 28 may be attached to line 26 at a selected height above fishing hook 10 to position hook 10 at a desired depth below the surface of the water.

Figure 3:
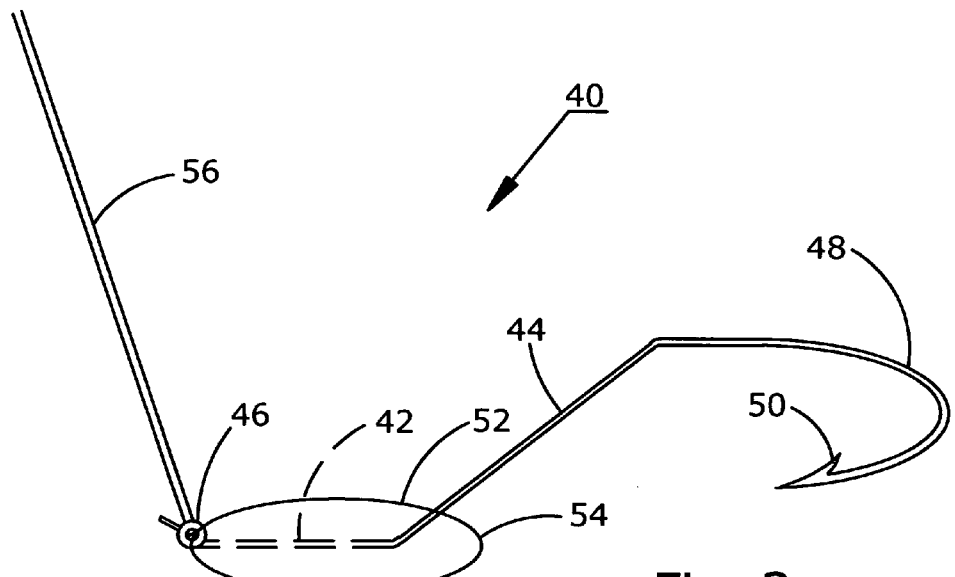
FIG. 3 is a front perspective view of the counterbalanced fishing hook of the invention according to a second embodiment.
Figure 4:
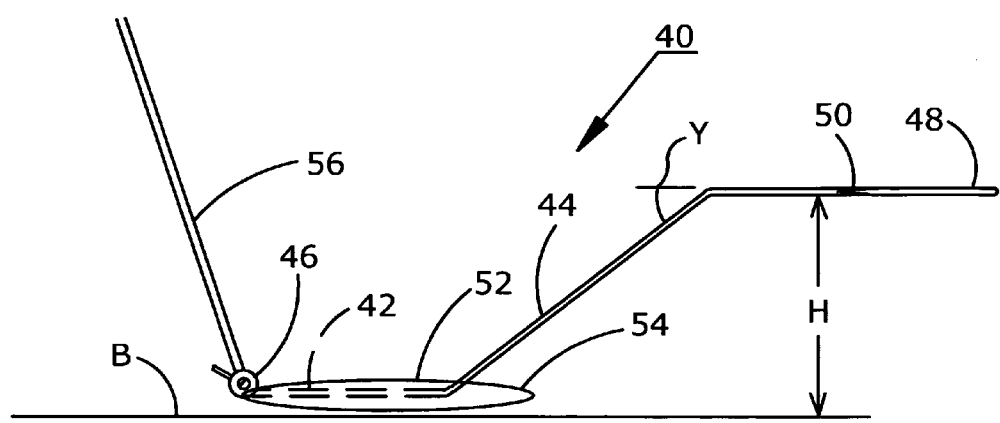
FIG. 4 is a side elevation view of the counterbalanced fishing hook of FIG. 3.

Referring now to FIGS. 3 and 4, a second embodiment of the invention is shown in perspective view and side elevation view, respectively. This second embodiment is designed for the purpose of bottom fishing, i.e. holding a fishing hook 40 in a horizontal plane adjacent to the bottom B of a body of water. Fishing hook 40 is formed with a horizontal shank portion 42, an upwardly angled shank portion 44, a curved portion 48, and a barb 50. Angular shank portion 44 is set at an angle Y to curved portion 48, as well as to horizontal shank portion 42. Angle Y is preferably between approximately 30° and 60°, and most preferably approximately 45°. An eye 46 is formed at the end of horizontal shank portion 42, eye 46 being oriented at an angle thereto, as seen in FIG. 2A. A weight 52 is affixed to horizontal shank portion 42, a small segment of eye 46, and a small segment of angular shank portion 44 in order to maintain the relative orientation of these components. Weight 52 is configured and formed of a material for being smoothly dragged along bottom B with line 56, line 56 oriented at a leading angle. As will be understood, no float is attached to line 56.

Referring further to FIGS. 3 and 4, weight 52 is formed of lead to have a substantially flat bottom and curved edge portions in order to remain on the surface of bottom B and not dig into bottom B as hook 40 is pulled by line 56. Weight 52 is wider in plan view than it is high in elevation view. Weight 52 is formed further with a trailing portion 54 that extends below angular shank portion 44 of hook 40 to stabilize curved portion 48 at a fixed height H above bottom B, height H being approximately 2.0 cm (¾ inch) in one embodiment of the invention. The mass of weight 52 is sufficient to stabilize curved portion 48 and barb 50 at height H above bottom B. As with the first embodiment of the invention, curved portion 48 and barb 50 are held in a horizontal plane to more effectively catch certain types of fish, e.g. flounder. Optionally, a pin (not shown) may be passed through eye 46 and inserted into a portion of an artificial lure to stabilize the lure during use.

While the description above discloses preferred embodiments of the present invention, it is contemplated that numerous modifications of the invention are possible and are considered to be within the scope of the claims that follow.

What is claimed is:

1. A counterbalanced fishing hook, comprising:
   a. a curved portion having a first end and a second end and oriented in a first plane;
   b. a barb formed at the first end of the curved portion in the first plane;
   c. a linear shank portion having a first end and a second end and oriented in a second plane, the second plane being substantially parallel to and offset from the first plane;
   d. an eye formed at the second end of the linear shank portion;
   e. an angular shank portion connecting between the second end of the curved portion and the first end of the linear shank portion; and
   f. a substantially planar weight fixedly mounted to the linear shank portion, the weight residing in the second plane;
   g. whereas when the weight rests on the bottom of a body of water the curved portion and the barb reside a selected distance above the bottom to orient the curved portion and the barb substantially parallel to a plane of the bottom.

2. The counterbalanced fishing hook described in claim 1, wherein the eye is oriented at an upward angle to the linear shank portion to remain above the bottom.

3. The counterbalanced fishing hook described in claim 2, wherein the upward angle between the eye and the linear shank portion is between approximately 30° and 90°.

4. The counterbalanced fishing hook described in claim 3, wherein the upward angle between the eye and the linear shank portion is approximately 45°.

5. The counterbalanced fishing hook described in claim 1, wherein the weight comprises a trailing portion that extends beyond the first end of the linear shank portion to reside below a part of the angular shank portion.

6. The counterbalanced fishing hook described in claim 1, wherein the selected distance above the bottom for the curved portion and the barb is approximately 2.0 cm.

7. A counterbalanced fishing hook, comprising:
   a. a substantially planar weight residing in a first plane;
   b. a curved portion terminating in a barb, the curved portion and barb residing in a second plane parallel to and offset from the first plane; and
   c. an angular shank portion connected at a first end thereof to a linear shank portion residing in the first plane and a second end thereof to the curved portion;
   d. whereas the weight is formed for residing on the bottom of a body of water and causing the curved portion and the barb to reside a selected distance above and parallel to the bottom.

8. The counterbalanced fishing hook described in claim 7, wherein the weight further comprises a trailing portion in the first plane and extending beyond the connection of the angular shank portion to the linear shank portion for stabilizing the curved portion and the barb.

9. The counterbalanced fishing hook described in claim 7, wherein the substantially planar weight is wider than it is high.

\* \* \* \* \*